P. E. BRENDEMUEHL.
DEVICE FOR TRACTION ENGINES.
APPLICATION FILED DEC. 16, 1913.
1,119,678.
Patented Dec. 1, 1914.
2 SHEETS—SHEET 2.
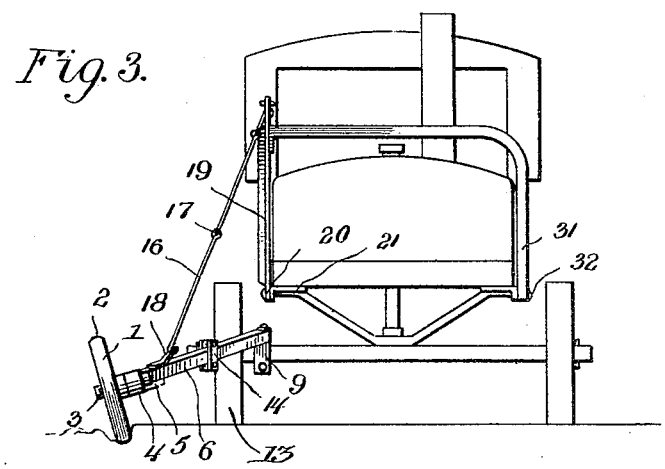
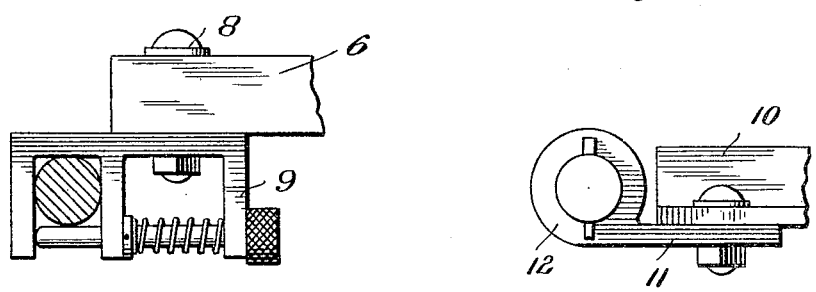
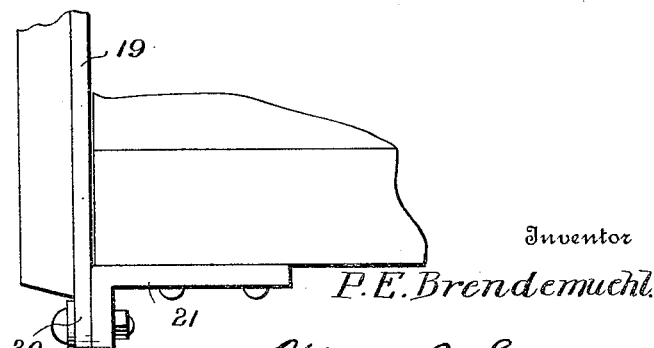

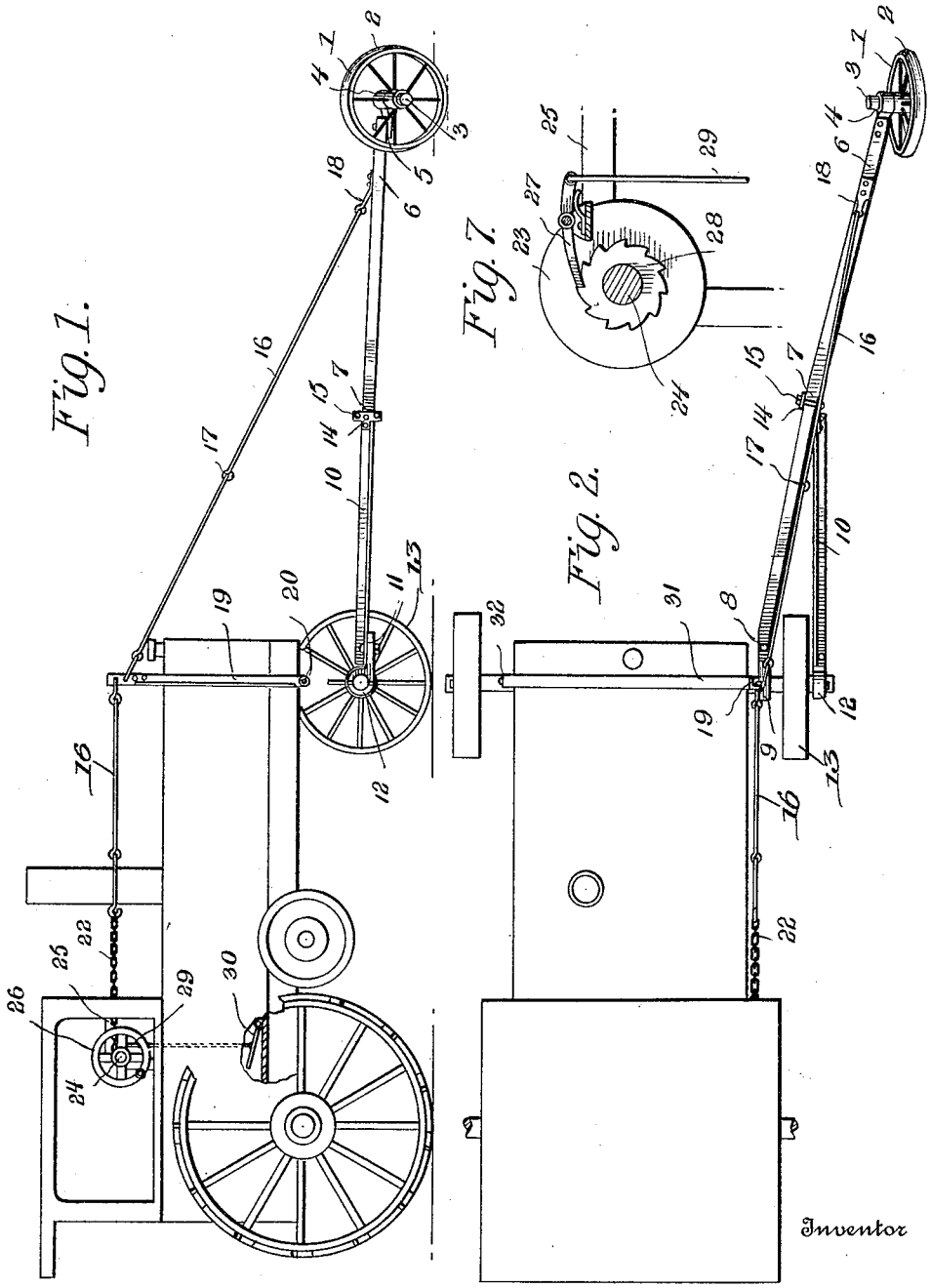

UNITED STATES PATENT OFFICE.

PAUL E. BRENDEMUEHL, OF HOPE, NORTH DAKOTA.

DEVICE FOR TRACTION-ENGINES.

1,119,678.   Specification of Letters Patent.   Patented Dec. 1, 1914.

Application filed December 16, 1913. Serial No. 807,065.

*To all whom it may concern:*

Be it known that I, PAUL E. BRENDEMUEHL, a citizen of the United States, residing at Hope, in the county of Steele and State of North Dakota, have invented new and useful Improvements in Devices for Traction-Engines, of which the following is a specification.

This invention relates to automatic steering mechanism, the same being especially designed for use on traction engines used for operating agricultural machinery across fields and particularly plows, the mechanism of this invention being so constructed and arranged relatively to the traction engine that said engine will be automatically steered and forced to maintain a course parallel to the preceding furrow, the steering mechanism embodying a wheel which travels in the furrow and follows the direction thereof.

With the above and other objects in view, the invention consists in the construction, combination and arrangement of parts, as will hereinafter be more fully described, illustrated and claimed.

In the accompanying drawings: Figure 1 is a side elevation of a traction engine equipped with the automatic steering mechanism of this invention. Fig. 2 is a plan view of the same. Fig. 3 is a front elevation thereof. Fig. 4 is a detail view of the connection between the steering beam and hub of the adjacent steering wheel. Fig. 5 is a detail view of the clip by which the steering beam is connected to the axle. Fig. 6 is a detail view of the hinge connection between the lifting post and the frame of the machine. Fig. 7 is a detail section showing the pawl and ratchet mechanism for holding the drum shaft.

Referring to the drawings 1 designates what I term a furrow wheel or in other words a wheel which is designed to travel in the furrow at one side and at a point in advance of the front of the traction engine as clearly illustrated in the drawings. This wheel preferably comprises an externally rounded rim or felly 2 and an axle 3 which is carried by a bearing member 4 bolted or otherwise fastened as shown at 5 to the forward extremity of the main steering beam 6.

The beam 6 which is preferably formed of metal has a slight bend at the point 7 intermediate the ends thereof so that the forward portion of the beam in advance of the bend 7 will incline downwardly to permit the furrow wheel 1 to travel in the furrow while the rear portion of the steering beam maintains a substantially horizontal position. At its rear end the steering beam 6 is provided with a down turned pivot 8, said pivot being received in a two-part axle clip 9 adapted to be placed around the axle and bolted or otherwise fastened thereto.

10 designates a radius rod or brace provided at the rear end thereof with a clip 11 having a ring 12 adapted to slip over the outer end portion of the hub of the adjacent steering wheel 13 to which it may be fastened by the same pin which fastens the hub cap in place. The forward extremity of the rod 10 is connected to the steering beam 6 adjacent to the pin 7 by means of a two-part clamp 14, the clamp members being fastened together by bolts 15 thus providing for an adjustment between the radius rod 10 and the steering beam 6 so as to set the furrow wheel farther to one side or the other.

The ring 12 and the clip 9 permit the steering beam 6 together with the radius rod 10 to swing in an upward and downward direction thereby enabling the steering mechanism to be elevated out of contact with the ground for the purpose of storage or transportation and to enable the ordinary steering mechanism of the traction engine to be operated without being affected by the automatic steering mechanism of this invention.

In order to lift the furrow wheel, I employ a lifting rod 16 which is provided at intervals with joints 17 therein to give flexibility to the rod for the purpose of enabling the furrow wheel to rise and fall in accordance with irregularities in the ground. The forward extremity of the rod 16 is connected to the eye of a clip 18 permanently bolted or otherwise attached to the steering beam 6 near the forward end thereof.

At a point intermediate the ends of the rod 16, there is a lifting post 19 which is pivotally connected at 20 at its lower end to a hinge member or bracket 21 fastened in any convenient way to an adjacent portion of the machine frame. The rod 16 is divided adjacent to the post 19 and the adjacent ends of the sections of the rod are connected to the upper extremity of the post as clearly shown in the drawings. To the rear extremity of that part of the rod 16 which extends rearwardly from the post 19 is connected a chain 22 which passes around a drum 23 on a shaft 24 journaled in a supporting frame 25 fastened to the frame of the machine adjacent to the operator. Fast on the shaft 24 of the drum is a hand wheel 26 by means of which the operator may turn the drum to wind up the chain 22 and thereby lift the furrow wheel 1.

27 designates a pawl which engages a ratchet wheel 28 on the shaft 24 and 29 designates a rod extending downwardly to a tripping foot lever 30. The operator by pressing on the trip lever 30 may release the pawl 27 from the ratchet wheel 28 thereby releasing the chain 22 and allowing the furrow wheel 1 to drop until it is located in the furrow.

In order to brace and steady the lifting post 19, I provide a swing brace 31 the lower end of which is pivotally mounted at 32 on the machine frame and the upper end of which extends over the hood of the engine as shown in Fig. 2 and is attached to the post 19 near the upper end thereof.

From the foregoing description it will be understood that the furrow wheel follows the landside and resists any tendency of the traction engine to steer away from the preceding furrow, causing the traction engine to proceed in a direction parallel to said furrow. As often as may be found necessary the furrow wheel may be raised out of the furrow and elevated to permit the ordinary steering mechanism of the traction engine to be operated without interference on the part of the automatic steering mechanism of this invention. This enables short turns to be made at the ends of the rows and to extricate the traction engine from soft places at which time the automatic steering mechanism would be in the way. The provision for lifting the furrow wheel also facilitates backing the traction engine and turning the same while backing. The automatic steering mechanism also provides for steering the traction engine along a side hill without liability of leaving its proper course. Furthermore the automatic steering mechanism may be quickly detached from the traction engine when not in use and as quickly returned to its position on the machine. Furthermore the steering mechanism is of light construction and does not throw any additional burden on the engine.

What I claim is:

1. The combination with a traction engine, of a steering beam having a jointed connection with one of the steering knuckles of said machine and extending forwardly to a point in advance of the traction engine, a furrow wheel journaled on the forward extremity of said steering beam, and means for raising and lowering said steering beam comprising a hinged lifting post, a manually controlled drum, flexible connections between said drum and steering beam, said connections being also attached to said lifting post, and a swing brace having a pivotal connection with the frame of the traction engine at the side opposite said lifting post, said brace extending upwardly over the engine and being attached to said post to swing therewith.

2. The combination with a traction engine, of a steering beam having a jointed connection with one of the steering knuckles of said machine and extending forwardly to a point in advance of the traction engine, a furrow wheel journaled on the forward extremity of said steering beam, and means for raising and lowering said steering beam comprising a hinged lifting post, a swing brace having a pivotal connection with the frame of the traction engine at the side opposite said lifting post, said brace extending upwardly over the engine and being attached to said post to swing therewith, and means for swinging said lifting post.

In testimony whereof I affix my signature in presence of two witnesses.

PAUL E. BRENDEMUEHL.

Witnesses:
R. A. LATHROP,
H. C. ERSTAD.

Copies of this patent may be obtained for five cents each, by addressing the "Commissioner of Patents, Washington, D. C."